United States Patent [19]

Hodgetts

[11] Patent Number: 4,892,456
[45] Date of Patent: Jan. 9, 1990

[54] UNLOADING SYSTEM FOR FREIGHT CONTAINERS

[75] Inventor: Graham L. Hodgetts, Mars, Pa.

[73] Assignee: Rolflor Industries, Inc., Warrendale, Pa.

[21] Appl. No.: 152,105

[22] Filed: Feb. 4, 1988

[51] Int. Cl.⁴ .............................................. B65G 67/02
[52] U.S. Cl. ..................................... 414/527; 198/499; 410/92
[58] Field of Search .................... 410/92, 52; 414/527, 414/528, 499; 198/750, 499; 296/98, 136

[56] References Cited

U.S. PATENT DOCUMENTS

| | | | |
|---|---|---|---|
| 2,353,948 | 7/1944 | Swift | 414/527 |
| 2,563,158 | 8/1951 | Claffey | 414/527 |
| 2,595,395 | 5/1952 | Lavelle et al. | 414/527 |
| 2,916,169 | 12/1959 | De Witt | 414/528 |
| 3,021,894 | 2/1962 | La Due | 296/98 |
| 3,051,298 | 8/1962 | Knight | 414/528 |
| 3,214,048 | 10/1965 | Terho | 414/499 |
| 3,315,794 | 4/1967 | Ellington | 198/499 |
| 3,593,864 | 7/1971 | Moser | 414/528 |
| 3,704,798 | 12/1972 | Carpenture, Jr. et al. | 414/527 |
| 3,937,338 | 2/1976 | Cox | 414/528 |
| 4,505,512 | 3/1985 | Schmeichel et al. | 296/98 |

Primary Examiner—Andres Kashnikow
Assistant Examiner—Michael J. Forman
Attorney, Agent, or Firm—Fleit, Jacobson, Cohn, Price, Holman & Stern

[57] ABSTRACT

A freight container and trailer combination for transporting the container over land is provided with a self-contained automatic system for unloading the container. A load-supporting belt extends along the floor of the container from a wind-up roll at the forward end of the container. The trailer has a drive drum suspended beneath the back end thereof, and the belt be attached to the drive drum through securing straps. When operated, the drive drum pulls on the belt to move a load out of the container. A drive mechanism is provided at the front end of the trailer for engaging the wind-up roll and rewinding the belt thereon when the container has been unloaded.

3 Claims, 2 Drawing Sheets

UNLOADING SYSTEM FOR FREIGHT CONTAINERS

FIELD OF THE INVENTION

This invention relates to an unloading system for transportable freight containers or boxes, for example, of the type which are used as shipping containers and which may be transported over land on tractor trailer trucks and the like.

SUMMARY OF THE INVENTION

Freight containers of the above type generally have a rear end access opening, with hinged or other doors, through which opening a container is loaded and unloaded. The loading and unloading of freight into and out of such containers are operations which may involve the use of heavy load handling equipment, and it is accordingly necessary to have such equipment available at loading and unloading locations.

It is an object of the present invention to provide a lightweight and inexpensive means for automatically unloading freight containers of the type referred to.

It is another object of the invention to provide a container unloading system which incorporates a drivable belt on the floor of the container for moving a load from within the container by movement of the belt, which is designed so as to provide minimum reduction in the load handling capacity of the container.

It is a further object of the invention to provide an integrated freight container and trailer chassis having separate but cooperable components which together provided an integrated system for unloading the container when it is positioned on the trailer.

In fulfillment of the above and other objects, the invention accordingly provides a specialized form of freight container on the one hand, and a specially adapted trailer chassis on the other hand, the container and chassis, when combined, providing the components for an integrated container unloading system. While containers and trailer chassis in accordance with the invention are intended for use in combination, the individual container and trailer units themselves constitute separate inventive subcombinations. Thus, in accordance with the invention, a freight container of the type referred to includes an internal freight unloading belt, preferably of a high tensile strength durable plastic material, one end of the belt being connected to a wind-up roll located internally at a forward end of the container so that the belt can extend along the floor of the container to and through the rear or loading and unloading end of the container. A trailer chassis in accordance with the invention is adapted to receive and carry the container and has a driven roll at the back end of the chassis, around which the back end of the aforementioned belt can be wound. Also, at the forward end of the trailer, a drive mechanism is provided which can engage and disengage the interior belt wind-up roll of the container for rewinding the belt thereon.

In operation, when the container is loaded, the belt is unwound from the take-up roll, at least to the extent that it covers the entire length of the container floor, and freight is loaded on the belt. For unloading the container on the trailer chassis, the back end of the belt is secured to the back end trailer drive roll, whereby rotation of the drive roll causes the belt progressively to be wound thereon, thereby also unloading the container of freight through the rear end opening. When the container has been fully unloaded, the belt may be rewound onto the internal container take-up roll using the engagable, disengagable drive mechanism at the forward end of the trailer.

Additional features and advantages of the invention will become apparent from the ensuing description and claims, read in conjunction with the attached drawings.

BRIEF DESCRIPTION OF DRAWINGS

FIG. 5 is an end elevational view, part broken away, of a drive roll structure at the back end of the trailer;

FIG. 6 is a sectional view on line 6—6 of FIG. 5; and

FIG. 7 is a perspective view of a part of the trailer drive roll and connector.

DESCRIPTION OF PREFERRED EMBODIMENT

Figure 1:
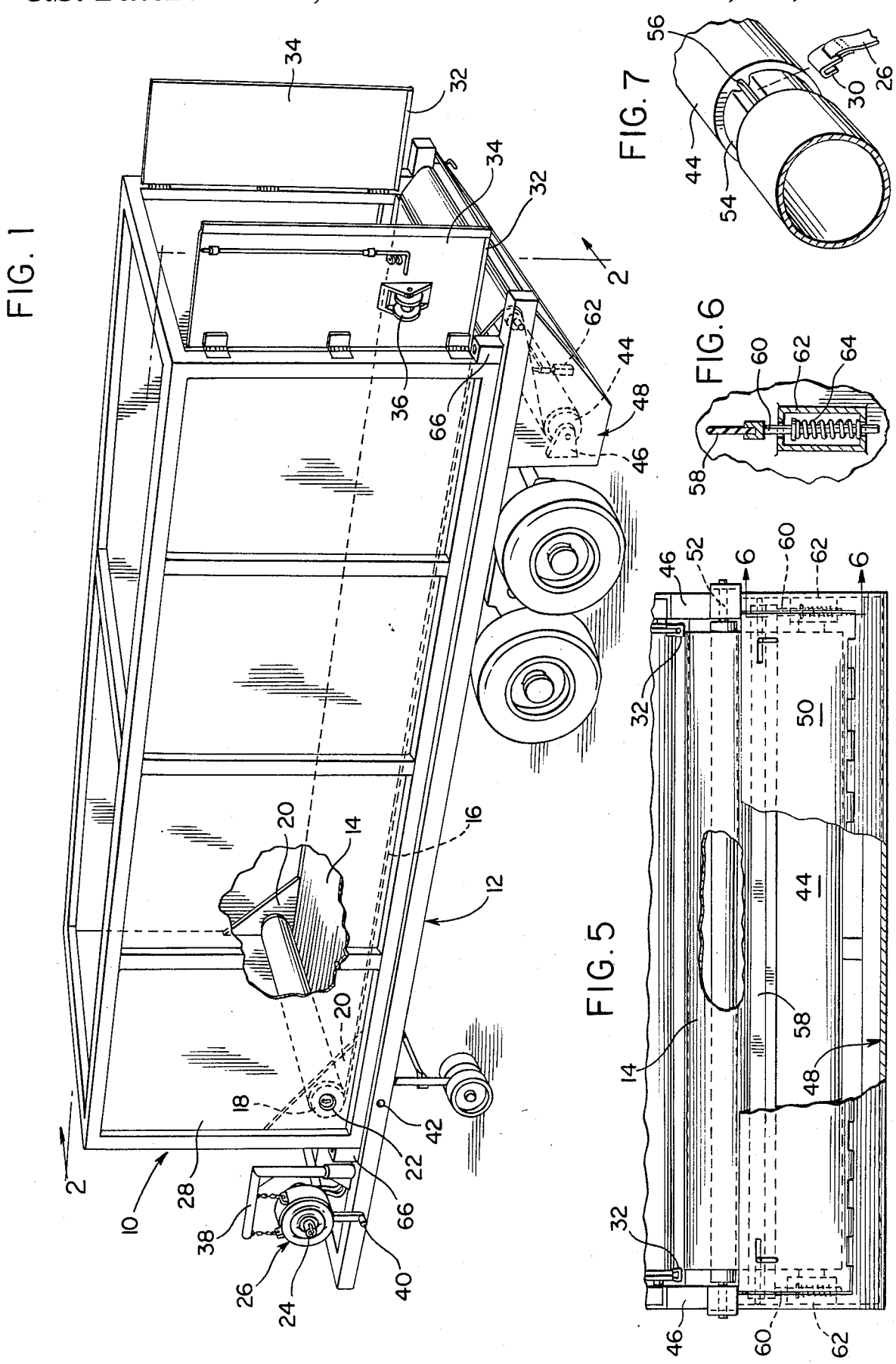
FIG. 1 is perspective view of a container-trailer combination in accordance with the invention.
Figure 2:
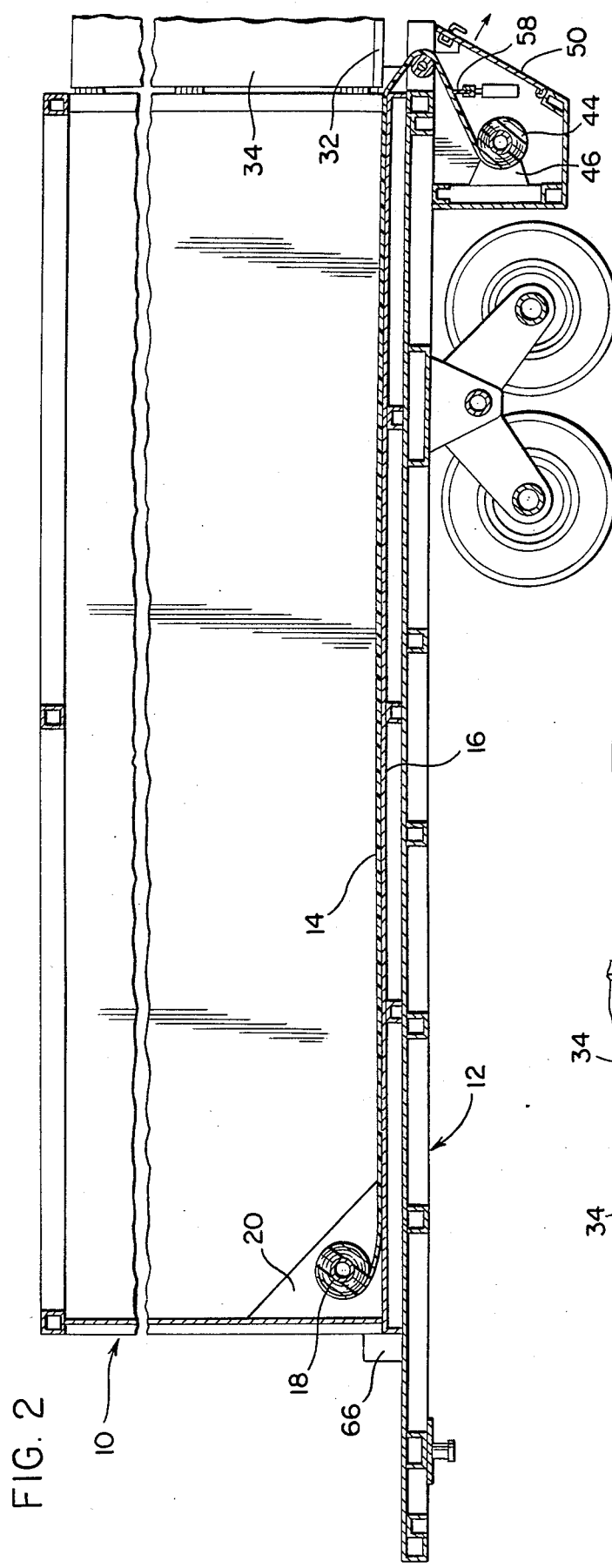
FIG. 2 is a sectional view on line 2—2 of FIG. 1.

The drawings show a freight container 10 in combination with a trailer chassis 12, the container and trailer having respective components (as will be described) of a system for unloading the container when it is positioned on the trailer.

Referring to the drawings in more detail, a durable plastic belt 14, preferably having a minimum tensile strength of about 50 tons, is laid flat on the floor 16 of the container. The front of the container is provided with a roll 18 for rewinding the belt 14. The roll is supported in the front end of the container by two bearings (not shown) on bracing plates 20 at opposite sides of the container, the bearings preferably having plastic bushings made of self-lubricating ultra-high molecular weight material. Roll 18 has no internal drive mechanism, merely a spline or keyed hub 22, exposed at one side of the container and into which a matching spline or key 24 of a drive mechanism 26 mounted on the chassis 12 can be inserted for rewinding the belt 14 onto roll 18, as will be described. It will be evident that a forward end of belt 14 is suitably secured to the roll.

The length of belt 14 should preferably be twice the length of container 10, plus sufficient belt for two wraps on the rewind roll 18 and an excess, say 14 feet, at the rear end. Attached to the rear end of belt 14 are two webbing straps 26 made of high tensile strength polyester, or the like, the straps extending say 10 feet beyond the rear edge of belt 14. A front seal (not shown) to seal between the surface of the belt and a front wall 28 of the container may be provided, as well two side seals (also not shown) for sealing between the side walls of the container and the surface of the belt for the full length of the container.

Figure 3:
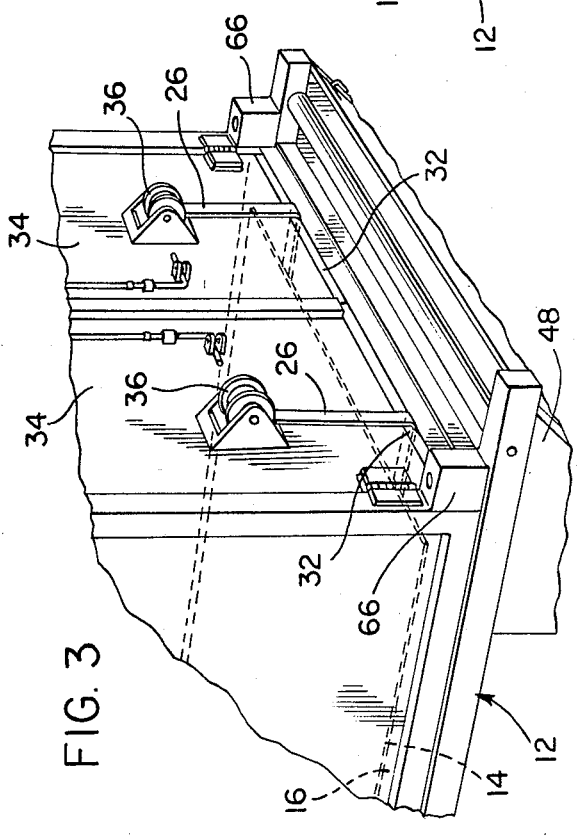
FIG. 3 is a perspective view of the back end portion of the container-trailer combination.

The free end of each strap 26 is provided with a hook-like clip or buckle 30 and, when the belt 14 is unwound along the floor of the trailer to the extent shown in FIG. 3, for example, the straps 20 extend through seals 32 provided at the base of the rear end container doors 34. The doors may carry external wind up reels 36 onto which the straps 26 may be wound, also as shown in FIG. 3, when the loaded container is being transported.

The trailer chassis 12 has at its forward end a davit device 38 on which is adjustably supported the drive mechanism 26, with the spline or keyed shaft 24, previously referred to. The drive mechanism is supported in such a way that when it is required for rewinding belt 14 onto drum 18, davit 38 can swing around, and the drive mechanism can be adjusted in height so as to engage shaft 24 in hub 22. Also, the drive mechanism may have a reactor arm 40, which fits in a suitable aperture 42 in the trailer chassis to resist the rotational torque of the drive mechanism. Shaft 24 may be driven, for example, hydraulically, from the trailer chassis system.

Under the back end of the trailer chassis is a driven winding drum 44 suitably carried on brackets 46 or the like in a housing 48 having a swing-down rear access door 50 or the like. The winding drum 44 may be provided with internal drive mechanisms (not shown), as disclosed for example in co-pending patent Application Ser. No. 024,719, filed Mar. 11, 1987, and its continuation-in-part filed Dec. 10, 1987, the contents of which are specifically incorporated herein by reference. Also attached to the trailer frame is a idler roll 52, around which the belt 14 may be fed by pre-feeding the webbing straps 26 over the idler roll. The winding drum 44 has an outer surface which is essentially cylindrical, except that equidistant from the center are two annular grooves 54 including bars 56 to which the hooks 30 of the respective straps 26 may be attached when the belt 14 is to be wound onto drum 44.

Another feature of the invention is the provision, between idler roll 52 and drum 44, of a spring-mounted belt wiper blade 58 suitably mounted on rods 60, which extend plunger fashion into chambers 62 and are upwardly urged by coil springs 64. Wiper blade 58 is preferably made of ultra-high molecular weight plastic material with a sharpened nose or edge which scrapes the surface of belt 14 when the belt is wound onto and unwound from drum 44. The space between the wiper blade and the respective rolls 44 and 52 facilitates feeding of the webbing straps 26 between the idler roll and onto the winding roll for attachment thereto, without having to disassemble any part of the trailer, the wiper, or the winding mechanism. This operation is carried out by opening the access door 50. Because back tension created by a load on the belt 14 is substantial, the belt will not deflect to any significant extent, sufficient only to require that the wiper is spring loaded.

Figure 4:
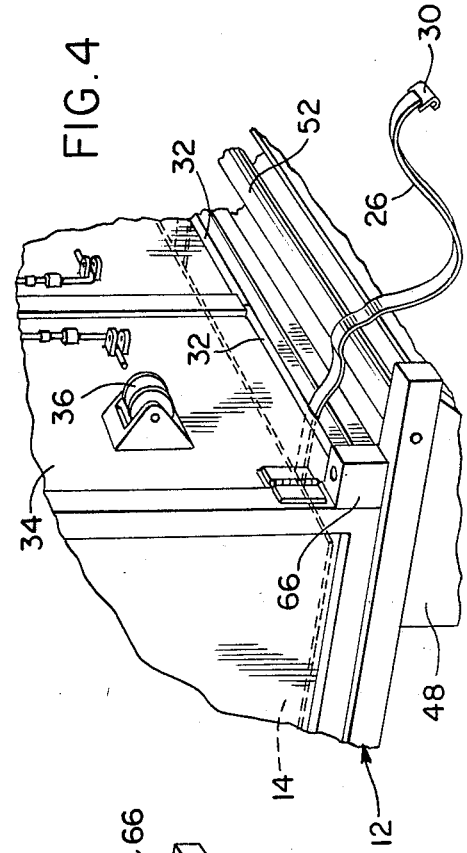
FIG. 4 is a view similar to FIG. 3, with belt straps released.

As previously noted, the container is loaded with belt 12 unwound along the container floor to the extent shown in FIG. 3, the doors 34 then being closed and straps 26 projecting through the seals 32, being wound onto reels 36. The container is attached to trailer chassis 12 in this manner, for example, by twist-lock devices 66 or any other well-known means. When unloading of the container is required, straps 26 are removed from the reels 36 (FIG. 4), wound around the back of idler roll 52 and onto the bars 56 of the wind-up drum 44. The drum is then set in motion and the webbing straps guided manually to apply tension to the back of belt 14. The doors 34 are then opened, and the winding is continued until the belt 14 moves a load completely out of the container.

During emptying of the container, the front drive mechanism 26 for rewind roll 18 is readied in position. At the end of the emptying sequence, the rewind mechanism is inserted into hub 22, and the rewind roll and belt 14 are rewound. The webbing straps 26 remain outside of the container doors 34. At the end of the rewinding process, the doors are closed, and the straps are again stowed on reels 36 to allow the emptied container to be moved.

The constructional material of both the container and the trailer chassis can be either steel or aluminum, although aluminum is preferred to maximize the payload which can be transported on highways.

It is evident from the foregoing that the invention provides an efficient and expedient, self-contained container rewinding system, which can readily be incorporated in newly manufactured containers or trailers or may be provided as a retrofitting.

While only a preferred embodiment of the invention has been described herein in detail, the invention is not limited thereby, and modifications can be made within the scope of the attached claims.

I claim:

1. A combination of a freight container and a trailer for transporting the container over land, the combination including means for releasably securing the container on the trailer and an unloading system for removing a load from the container when secured on the trailer, through one end, namely a back end, of the container, said unloading system including a wind-up roll within the container at a forward end thereof, a load transporting belt having a forward end secured to said roll, the belt having a length at least two times the length of the container for extending along a floor of the container to the back end of the container, a drive drum on the trailer, means for releasably attaching a back end of the belt to the drive drum, means for rotating the drum to wind up the belt on the drum and thereby unload the container, and drive means on the trailer for attachable/detachable engagement with the wind-up roll for rewinding the belt thereon when the container has been unloaded, wherein the means for releasably attaching comprises strap means extending from the back end of the belt and engagable/disengagable coupling elements of the strap means and drive drum, wherein the container includes rear door means with sealing means for the strap means to extend through when the container is loaded and reel means on the exterior of the door means for storing the strap means when detached from the drive drum.

2. A freight container without wheels and having a front end and a rear loading and unloading end, means on the container for releasably securing same on a wheeled trailer for transporting the container over land, a wind-up roll located within the container adjacent the front end, and a load transporting belt having a forward end secured to the wind-up roll, the belt having a length at least twice the length of the container, whereby the belt can be extended along a floor of the container for receiving a load thereon, and the belt can be used to unload the container when a back end of the belt is pulled by external drive means to unwind the belt from the wind-up roll, strap means on the back end of the belt with attachment means thereon for releasably securing the strap means to an external drive means for unwinding the belt and rear door means with opening means for the strap means to extend through and storage means for the strap means on the exterior of the door means.

3. A trailer for transporting a freight container over land, the trailer having a forward end and a rear end and means for releasably securing a freight container thereon, a drive drum suspended beneath the rear end of the trailer for use in unwinding a load-supporting belt from within a container on the trailer in unloading the container, and a drive mechanism at a forward end of the trailer including means for selective engagement-/disengagement with a take-up roll in the container for rewinding the belt on the tape-up roll, wherein the drive mechanism is carried on a swinging davit at the forward end of the trailer for engaging/disengaging a drive hub of the take-up roll and wherein the drive mechanism includes a reactor arm for reacting against the trailer when the drive mechanism is engaged with the drive hub and resisting drive torque.

* * * * *